(12) United States Patent
Tamada et al.

(10) Patent No.: US 9,522,646 B2
(45) Date of Patent: Dec. 20, 2016

(54) KNEE BOLSTER

(71) Applicant: KYORAKU CO., LTD., Kyoto (JP)

(72) Inventors: Teruo Tamada, Kanagawa (JP); Takafumi Funato, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 14/780,739

(22) PCT Filed: Mar. 5, 2014

(86) PCT No.: PCT/JP2014/055655
§ 371 (c)(1),
(2) Date: Sep. 28, 2015

(87) PCT Pub. No.: WO2014/156522
PCT Pub. Date: Oct. 2, 2014

(65) Prior Publication Data
US 2016/0082913 A1 Mar. 24, 2016

(30) Foreign Application Priority Data

Mar. 28, 2013 (JP) .................................. 2013-069437

(51) Int. Cl.
*B60R 21/055* (2006.01)
*B60R 21/045* (2006.01)
(Continued)

(52) U.S. Cl.
CPC .......... *B60R 21/055* (2013.01); *B60R 21/045* (2013.01); *B60R 2021/0051* (2013.01); *B60R 2021/0414* (2013.01)

(58) Field of Classification Search
CPC ................. B60R 21/055; B60R 21/045; B60R 2021/0051; B60R 2021/0414
See application file for complete search history.

(56) References Cited

U.S. PATENT DOCUMENTS 5,273,314 A * 12/1993 Sakakibara ........... B60R 21/045
 188/377
5,370,417 A * 12/1994 Kelman ................ B60R 21/045
 280/751

(Continued)

FOREIGN PATENT DOCUMENTS

JP 2012183961 A 9/2012
WO 2012-137889 A 10/2012

OTHER PUBLICATIONS

International Search Report dated May 20, 2014 from corresponding International Patent Application No. PCT/JP2014/055655; 2 pgs.

*Primary Examiner* — Darlene P Condra
(74) *Attorney, Agent, or Firm* — Maier & Maier, PLLC

(57) ABSTRACT

Provided is a knee bolster which does not significantly increase the vehicle weight and whose plastic deformation starting load can be easily controlled to a desired value. A knee bolster becomes deformed when a load from a knee of a passenger is inputted and thus absorbs a shock applied to the knee. The knee bolster includes a low-load absorption unit having a load input surface to which the load from the knee is inputted and a high-load absorption unit disposed in a more distant position from the knee than the low-load absorption unit in an input direction of the load and having a higher plastic deformation starting load than a plastic deformation starting load of the low-load absorption unit. The low-load absorption unit and the high-load absorption unit are formed of a single hollow structure or different hollow structures.

9 Claims, 11 Drawing Sheets

(51) Int. Cl.
   *B60R 21/04*    (2006.01)
   *B60R 21/00*    (2006.01)

(56) References Cited

U.S. PATENT DOCUMENTS

| | | | | |
|---|---|---|---|---|
| 5,716,093 A * | 2/1998 | Sadr | ................... | B60R 21/0428 |
| | | | | 296/146.6 |
| 6,096,098 A * | 8/2000 | Miracle | ................ | C11D 3/3917 |
| | | | | 252/186.27 |
| 7,108,316 B2 * | 9/2006 | Barvosa-Carter | ....... | B60R 21/04 |
| | | | | 280/751 |
| 7,143,876 B2 * | 12/2006 | Tamada | ................. | B60R 19/18 |
| | | | | 188/371 |
| 7,618,082 B2 * | 11/2009 | Tamada | ................. | B60R 19/18 |
| | | | | 296/146.6 |
| 7,992,895 B2 * | 8/2011 | Roychoudhury | ....... | B60R 21/02 |
| | | | | 280/728.1 |
| 8,356,836 B2 * | 1/2013 | Taracko | ................ | B60R 21/045 |
| | | | | 280/748 |
| 2003/0057692 A1 * | 3/2003 | Horsch | ................. | B60R 21/045 |
| | | | | 280/752 |
| 2003/0057760 A1 * | 3/2003 | Horsch | ................. | B60R 21/045 |
| | | | | 297/423.41 |
| 2003/0184070 A1 * | 10/2003 | Vidal | .................... | B60R 21/055 |
| | | | | 280/752 |
| 2004/0124623 A1 * | 7/2004 | Yamazaki | ............ | B60R 21/045 |
| | | | | 280/752 |
| 2006/0131861 A1 * | 6/2006 | Mani | .................... | B60R 21/045 |
| | | | | 280/752 |
| 2008/0093831 A1 | 4/2008 | Ellison | | |
| 2011/0115204 A1 * | 5/2011 | Mani | .................... | B60R 21/045 |
| | | | | 280/752 |
| 2012/0228856 A1 | 9/2012 | Arima | | |
| 2014/0048367 A1 | 2/2014 | Tani et al. | | |
| 2015/0061322 A1 * | 3/2015 | Tamada | ................. | B60R 19/18 |
| | | | | 296/187.05 |

* cited by examiner (a) LINE A-A END SURFACE SHAPE (b) LINE B-B END SURFACE SHAPE

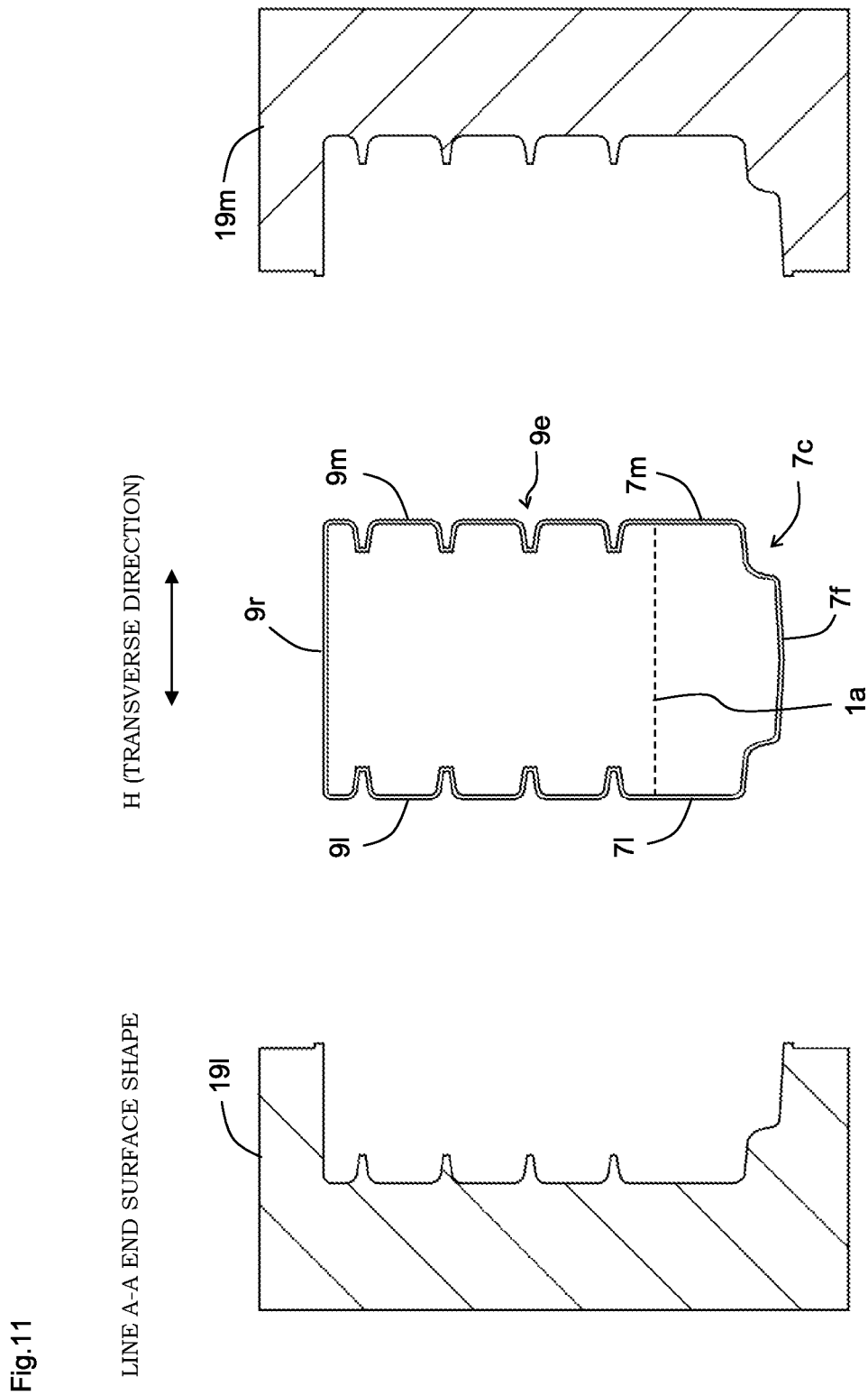

KNEE BOLSTER

TECHNICAL FIELD

The present invention relates to a knee bolster which becomes deformed when a load from a knee of a passenger is inputted, and thus absorbs a shock applied to the knee.

BACKGROUND ART

A knee bolster is disposed ahead of a knee of a passenger sitting on a front seat of a vehicle and has a function of protecting the knee of the passenger when the vehicle collides with something head-on. The load received by the knee bolster varies depending on whether the passenger is wearing a seat belt, whether the vehicle speed at the time of collision is high or low, or the like. A knee bolster having high rigidity can perform the knee protection function when a high load is inputted thereto. On the other hand, such a knee bolster does not become plastically deformed when a relatively low load is inputted thereto and thus its knee protection function does not substantially work.

To solve this problem, a knee bolster of Patent Literature 1 is manufactured by mounting a first bracket press-molded from one steel sheet on a steering hanger beam, mounting a second bracket press-molded from one steel sheet on the front end of the first bracket, and using a material having higher rigidity and strength than the material of the second bracket as the material of the first bracket. Thus, this knee bolster can accommodate both a high-load shock and a low-load shock.

PRIOR ART LITERATURE

Patent Literature

Patent Literature 1: Japanese Unexamined Patent Application Publication No. 2012-183961.
Patent Literature 2: WO2010/137889

SUMMARY OF INVENTION

Technical Problem

For the knee bolster of Patent Literature 1, however, the brackets, which are formed of steel sheets, significantly increase the vehicle weight. Further, it may not be always easy to control the load by which the knee bolster starts to be plastically deformed (hereafter referred to as the "plastic deformation starting load"), to a desired value by using different materials as the materials of the first and second brackets.

The present invention has been made in view of the foregoing. The present invention provides a knee bolster which does not significantly increase the vehicle weight and whose plastic deformation starting load can be easily controlled to a desired value

Solution to Problem

According to the present invention, a knee bolster becomes deformed when a load from a knee of a passenger is inputted, and thus absorbs a shock applied to the knee. The knee bolster includes a low-load absorption unit having a load input surface to which the load from the knee is inputted and a high-load absorption unit disposed in a position more distant from the knee than the low-load absorption unit in an input direction of the load and having a higher plastic deformation starting load than a plastic deformation starting load of the low-load absorption unit. The low-load absorption unit and the high-load absorption unit are formed of a single hollow structure or different hollow structures.

As a method for solving the problems with the above traditional technology, the inventor have conceived of forming a high-load absorption unit and a low-load absorption unit from a hollow structure. Since a hollow structure can be formed from a resin, use of a hollow structure can significantly reduce the weight compared to use of a steel sheet. Further, if a hollow structure is used, the plastic deformation starting load can be easily changed by changing its thickness or rib configuration (the shape or number of the ribs). Thus, a high-load formation and a low-load formation unit can be easily formed from a single resin.

Various embodiments of the present invention are described below. Any of the embodiments below can be combined with each other.

Preferably, the high-load absorption unit includes a rib having a wall surface and recessed toward a hollow portion, the wall surface being configured to be plastically deformed by the load, and the rib is formed so that the plastic deformation starting load of the high-load absorption unit becomes larger than the plastic deformation starting load of the low-load absorption unit.

Preferably, the high-load absorption unit includes a transverse groove-shaped rib having a wall surface and extending in the input direction of the load, the wall surface being configured to be plastically deformed by the load.

Preferably, the low-load absorption unit and the high-load absorption unit each include a transverse groove-shaped rib having a wall surface configured to be deformed by the load, and the transverse groove-shaped rib of the high-load absorption unit are formed so as to be deeper or larger in number than the transverse groove-shaped rib of the low-load absorption unit and/or so as to extend in a direction close to the input direction of the load.

Preferably, the high-load absorption unit includes a transverse groove-shaped rib h having a wall surface and extending in the input direction of the load, the wall surface being configured to be plastically deformed by the load, and a longitudinal groove-shaped rib extending in a direction approximately perpendicular to an extending direction of the transverse groove-shaped rib.

Preferably, the load input surface is inclined downward with respect to the load input direction.

Preferably, the low-load absorption unit and the high-load absorption unit are formed of different blow-molded hollow bodies, a parting line surface of the low-load absorption unit is approximately perpendicular to the input direction of the load, and a parting line surface of the high-load absorption unit is approximately parallel with the input direction of the load.

Preferably, the low-load absorption unit has a grid-shaped rib on the load input surface.

Preferably, the low-load absorption unit has, on a parting line thereof, a mounting piece for connecting the low-load absorption unit and the high-load absorption unit.

Preferably, the low-load absorption unit and the high-load absorption unit are formed of a single blow-molded hollow body.

BRIEF DESCRIPTION OF THE DRAWINGS

FIG. 11 is a drawing showing an example of split molds and corresponding to the line A-A end surface shape in FIG. 9(a).

DESCRIPTION OF EMBODIMENTS

Now, embodiments of the present invention will be described. Various features described in the embodiments below can be combined with each other.

<Example of Mounting of Knee Bolster 1>

Figure 1:
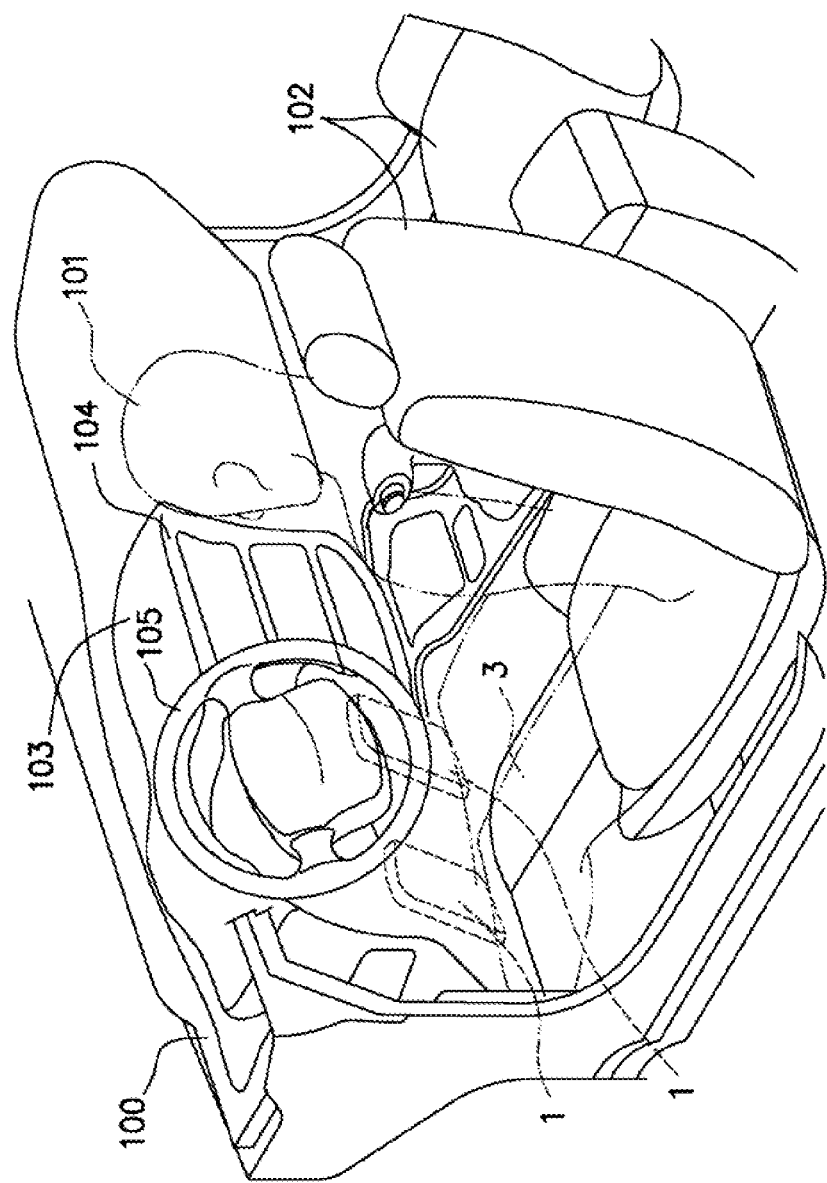
FIG. 1 shows an example of mounting of a knee bolster 1 of the present invention.

First, referring to FIG. 1, there will be described an example of mounting of a knee bolster 1 of the present embodiment. FIG. 1 shows a state in which the knee bolster 1 shown in FIGS. 2 to 11 serving as a shock absorber is mounted on a vehicle 100.

The vehicle 100 shown in FIG. 1 has a passenger cabin 103 containing front seats 102 for passengers including a driver 101. A meter 104 is located on a side of a handle 105. The handle 105 is connected to a steering column (not shown). The steering column is supported by a steering support member which is disposed in the width direction of the vehicle and supported on the inner wall surface of the vehicle. The knee bolsters 1 of the present embodiment are mounted on the driver's seat side in such a manner to sandwich the steering column. Spaces on both sides of the steering column are longitudinally long due to the mounting spaces of other vehicle components (meter 104, navigation system, air-conditioner, etc.). For this reason, the knee bolsters 1 are mounted adjacent to respective knees 3 of the driver 101 in the longitudinally long spaces. Thus, when the vehicle 100 receives a shock, the knees 3 of the driver 101 contact the corresponding knee bolsters 1, which then absorb the shock. As a result, the shock applied to the knees 3 is reduced. While the knee bolsters 1 on the driver's seat side are shown in FIG. 1, knee bolsters 1 are also mounted on the passenger's seat side in such a manner to be adjacent to the knees of a passenger on the passenger seat, as with the driver's seat side.

<Configuration of Knee Bolster 1>

1. First Embodiment

Figure 2:
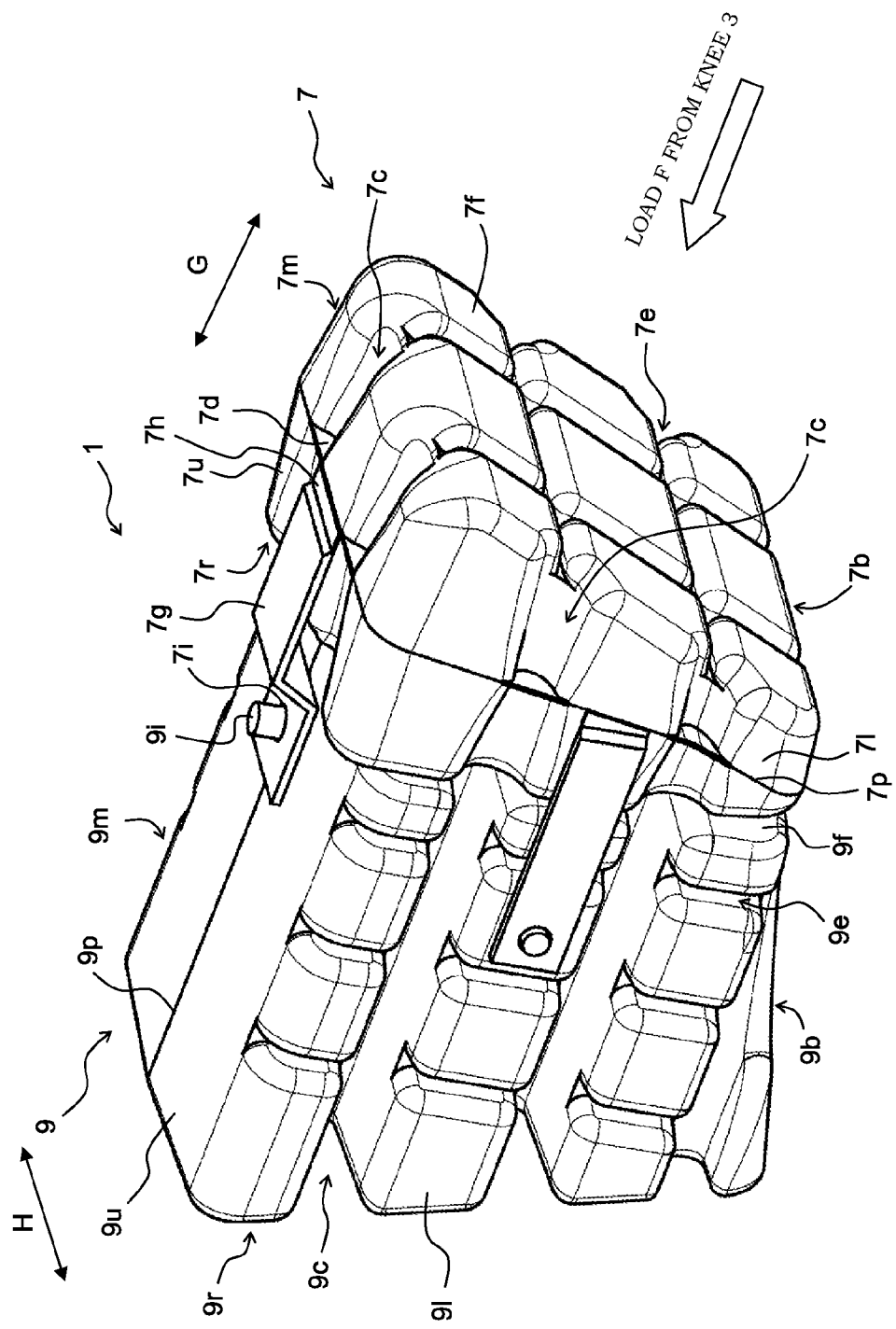
FIG. 2 is a perspective view of a knee bolster 1 of a first embodiment of the present invention.
Figure 3:
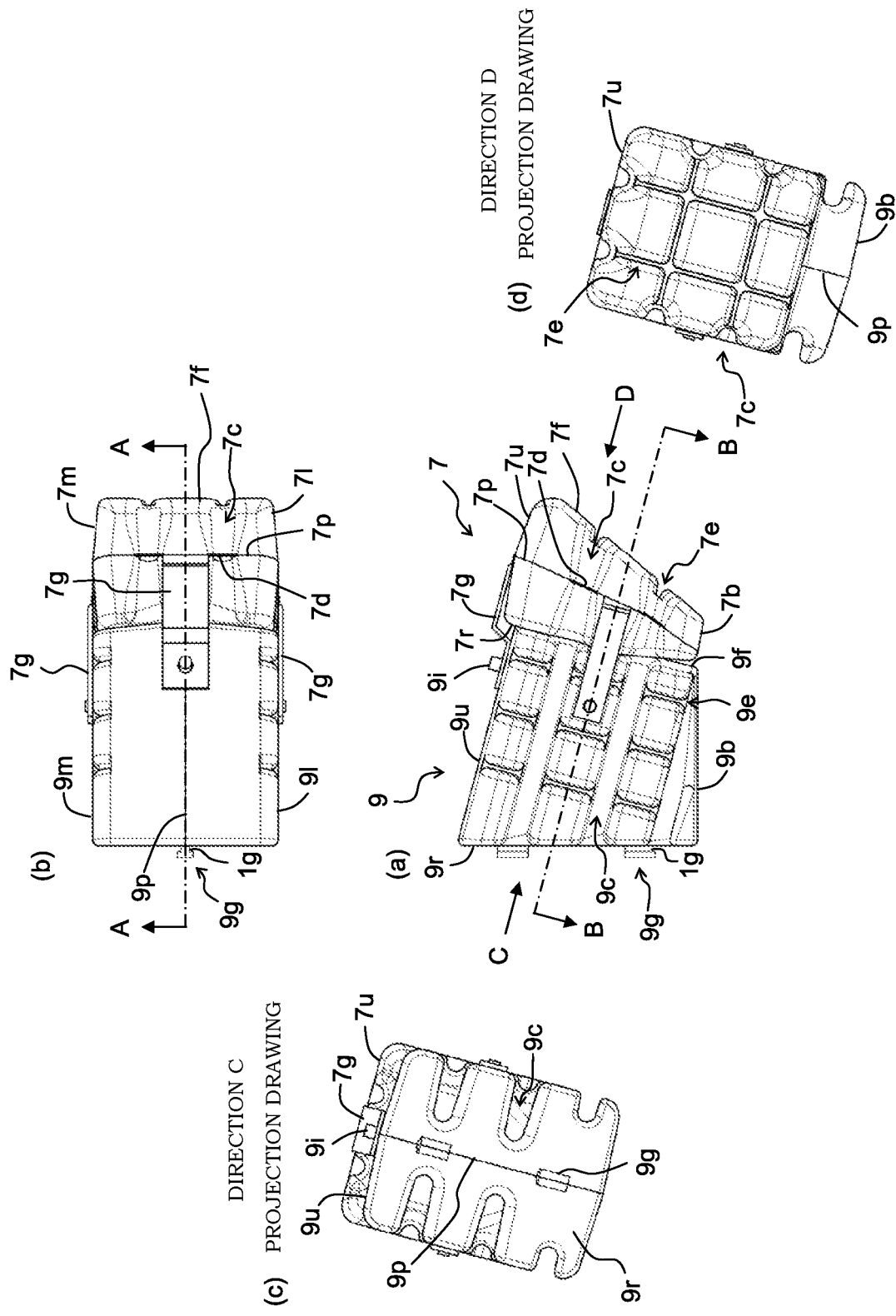
FIGS. 3(a) and 3(b) are front and plan views, respectively, of the knee bolster 1 in FIG. 2.
FIGS. 3(c) and 3(d) are projection drawings in the directions of arrows C and D, respectively, in FIG. 3(a).
Figure 4:
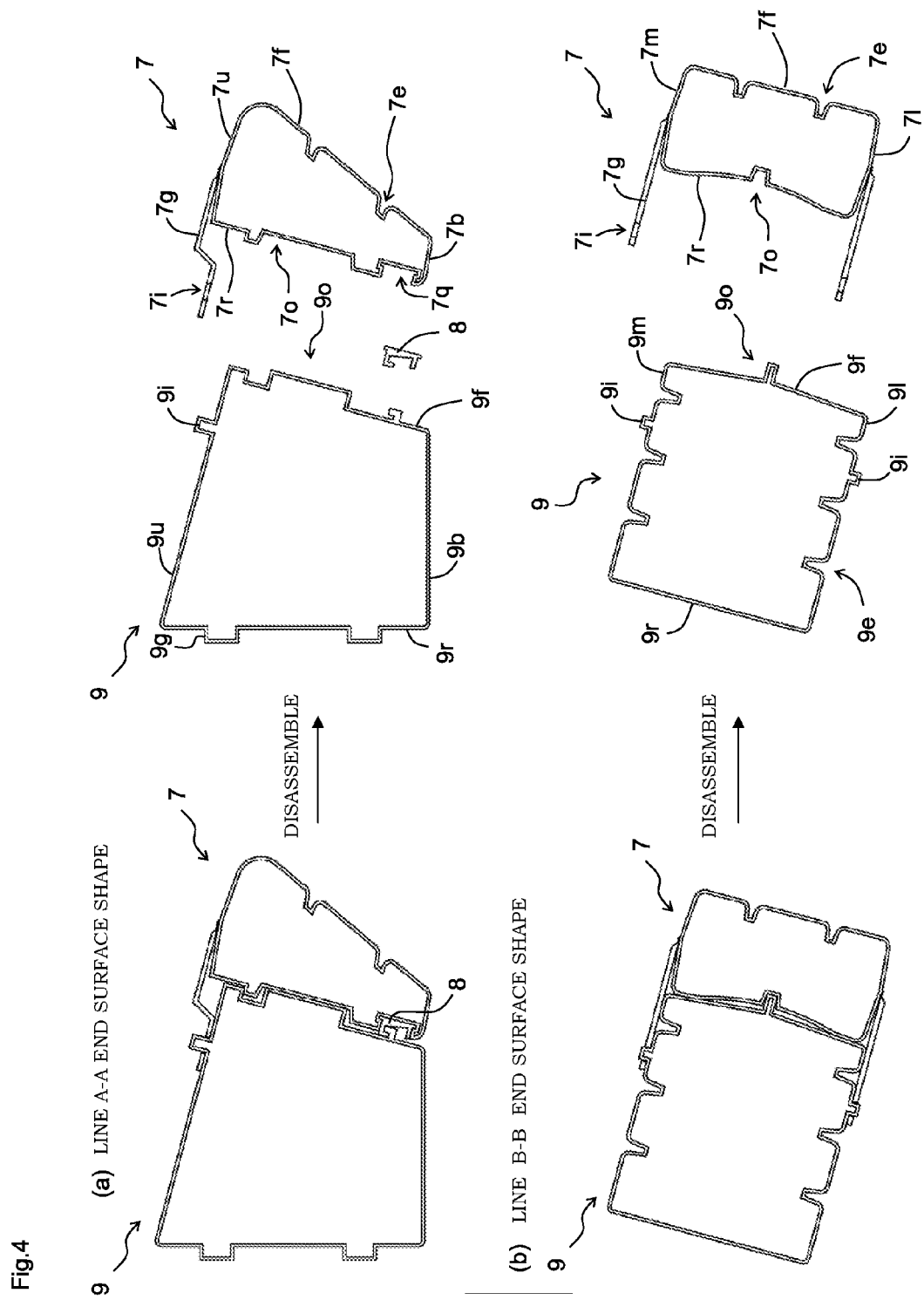
FIGS. 4(a) and 4(b) show line A-A and line B-B end surface shapes in FIGS. 3(a) and 3(b), respectively.
Figure 5:
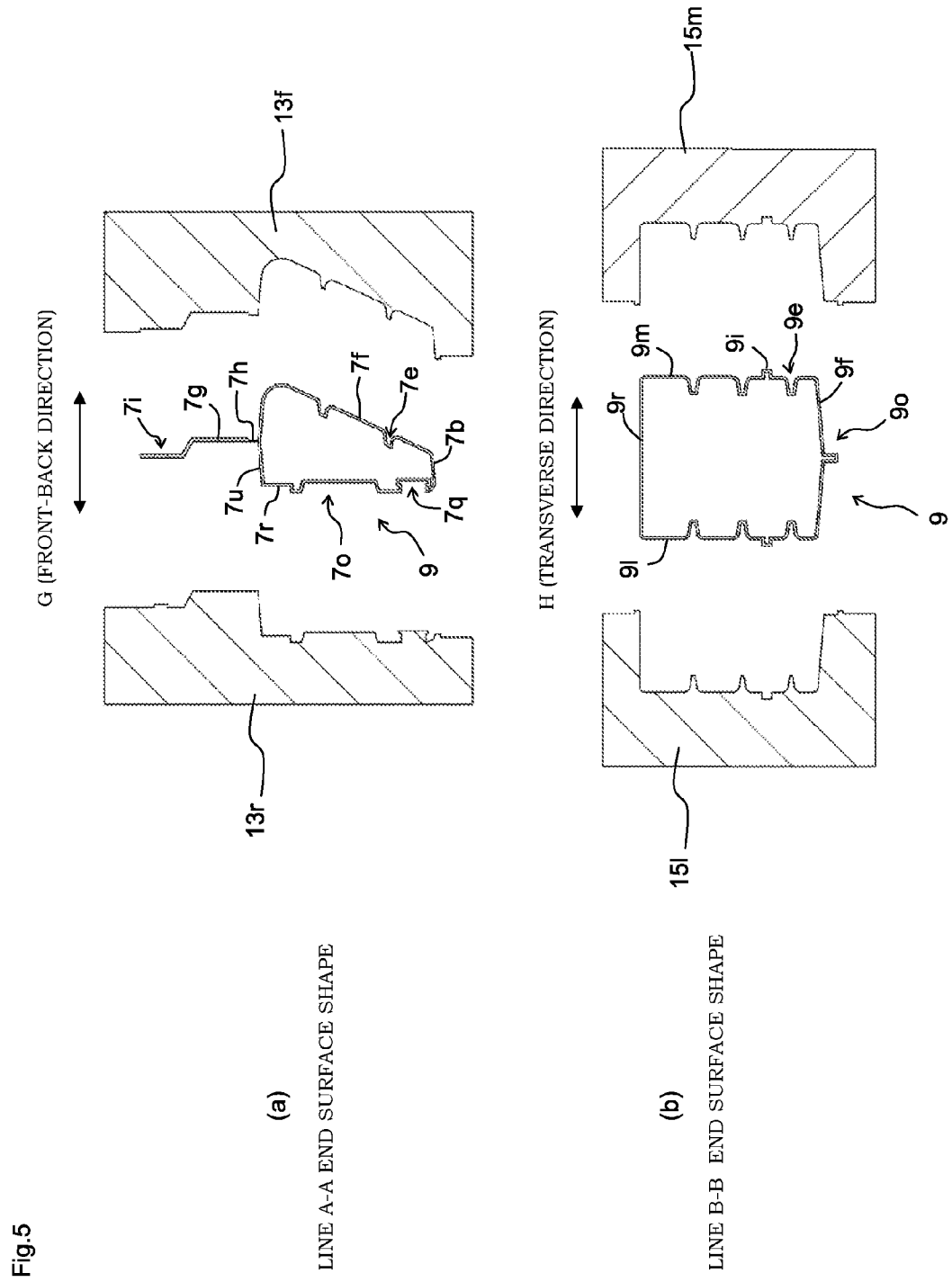
FIGS. 5(a) and 5(b) are drawings showing an example of split molds and corresponding to the line A-A and line B-B end surface shapes in FIGS. 3(a) and 3(b), respectively.
Figure 6:
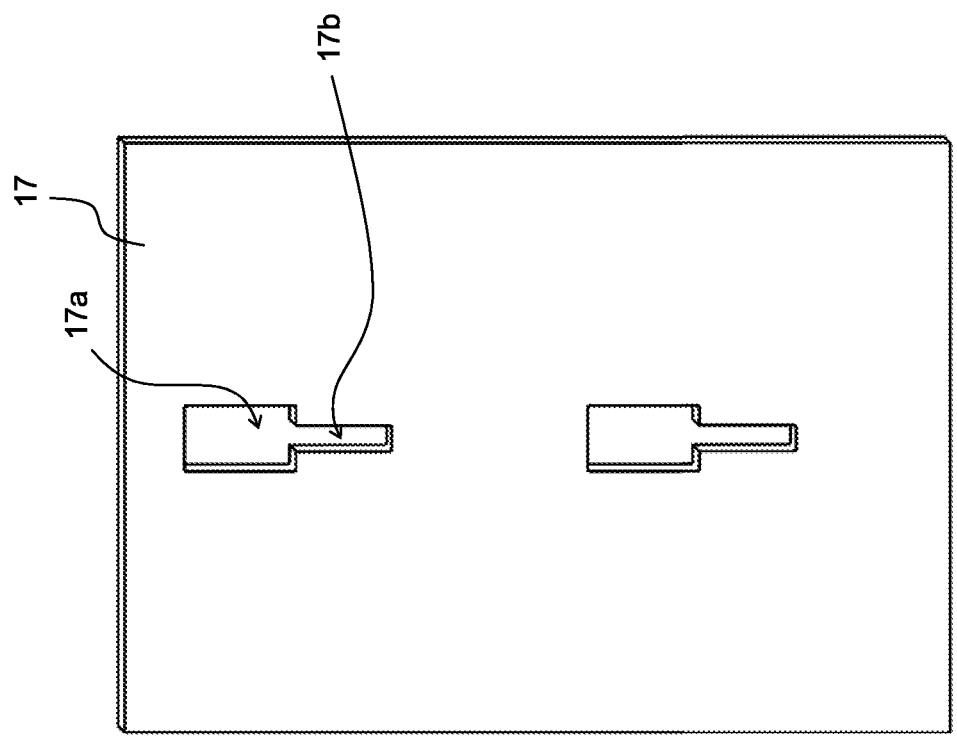
FIG. 6 is a perspective view showing an example of a target 17 on which the knee bolsters 1 are to be mounted.
Figure 7:
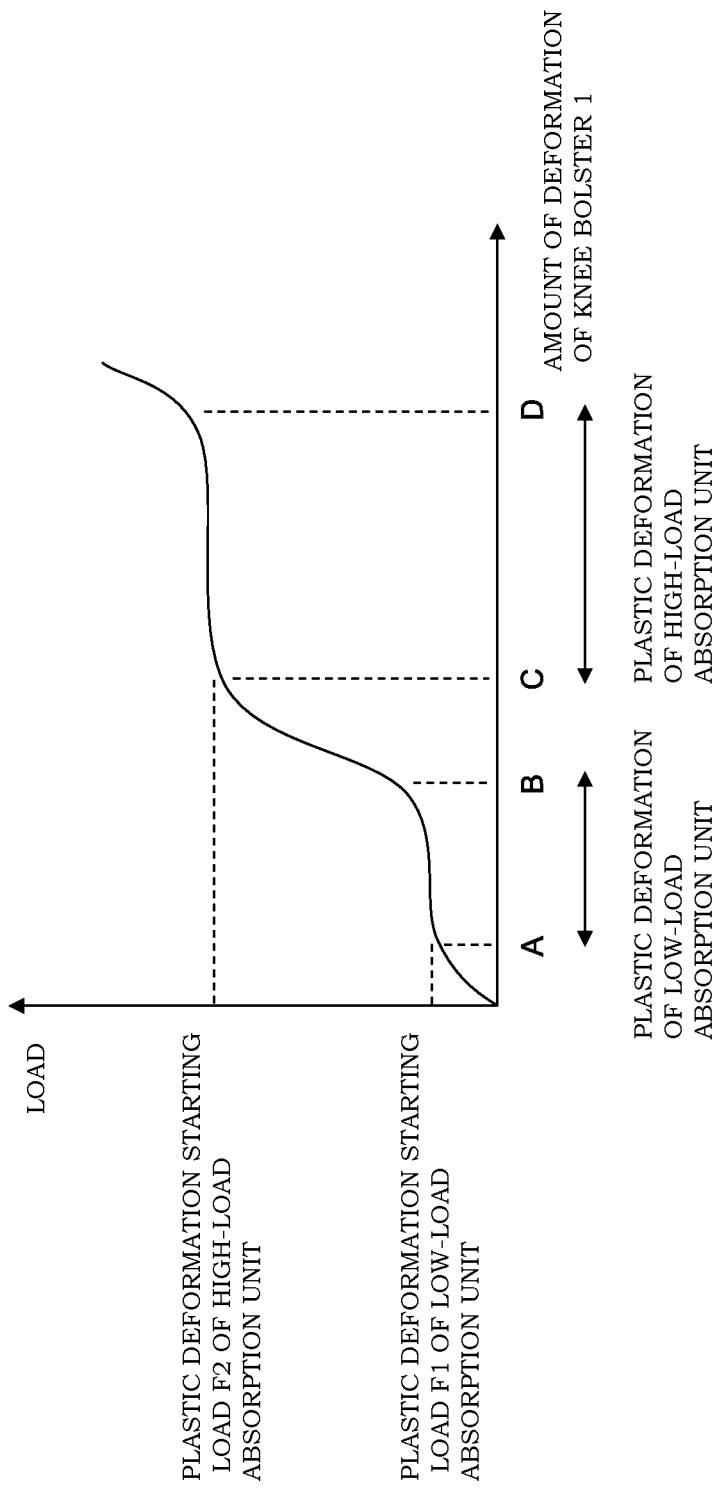
FIG. 7 is a graph showing an example of the relationship between a load and the amount of deformation of the knee bolster 1.

Referring to FIGS. 2 to 7, there will be described a knee bolster 1 of the first embodiment of the present invention. FIG. 2 is a perspective view of the knee bolster 1. FIGS. 3(a) and 3(b) are front and plan views, respectively, of the knee bolster 1. FIGS. 3(c) and 3(d) are projection drawings in the directions of arrows C and D, respectively, in FIG. 3(a). FIGS. 4(a) and 4(b) show the line A-A and line B-B end surface shapes in FIGS. 3(a) and 3(b), respectively. FIGS. 5(a) and 5(b) are drawings showing an example of split molds and corresponding to the line A-A and line B-B end surface shapes in FIGS. 3(a) and 3(b), respectively. FIG. 6 is a perspective view showing an example of a target 17 on which the knee bolsters 1 are to be mounted. FIG. 7 is a graph showing the relationship between the load and the amount of deformation of the knee bolster 1.

As shown in FIG. 2, the knee bolster 1 becomes deformed when a load F from a knee 3 of the passenger is inputted, and thus absorbs a shock applied to the knee 3. The knee bolster 1 includes a low-load absorption unit 7 that has a load input surface to which the load F from the knee 3 is inputted and a high-load absorption unit 9 which is disposed in a position more distant from the knee 3 than the low-load absorption unit 7 in the input direction of the load and whose plastic deformation starting load is higher than that of the low-load absorption unit 7. The low-load absorption unit 7 and high-load absorption unit 9 are formed of different hollow structures. In the present embodiment, the hollow structures are hollowed, blow-molded bodies.

The low-load absorption unit 7 has a front surface 7f that is adjacent to the knee 3 and serves as the load input surface, a back surface 7r opposite to the front surface 7f, an upper surface 7u, a bottom surface 7b, a right side surface 7m, and a left side surface 7l. The upper surface 7u, the bottom surface 7b, the right side surface 7m and the left side surface 7l connects the front surface 7f and back surface 7r, respectively. The high-load absorption unit 9 has a front surface 9f adjacent to the low-load absorption unit 7, a back surface 9r opposite to the front surface 9f, an upper surface 9u, a bottom surface 9b, a right side surface 9m, and a left side surface 9l. The upper surface 9u, the bottom surface 9b, the right side surface 9m and the left side surface 9l connects the front surface 9f and back surface 9r, respectively. Note that in the present specification, "upper," "lower," "right," "left," "front," and "back" are expressed from the perspective of the passenger.

Since the low-load absorption unit 7 is blow-molded using split molds 13f and 13r which are opened or closed in the front-back direction [the direction of an arrow G in FIGS. 2 and 5(a)] [see FIG. 5(a)], it has a parting line 7p formed over the upper surface 7u, right side surface 7m, bottom surface 7b, and left side surface 7l. Accordingly, the parting line surface (the surface surrounded by the parting line 7p) is approximately perpendicular to the input direction of the load F.

The low-load absorption unit 7 has transverse groove-shaped ribs 7c (hereafter referred to as the "transverse groove-ribs") on the upper surface 7u, bottom surface 7b, right side surface 7m, and left side surface 7l. The transverse-groove ribs 7c include those extending from the front surface 7f toward the parting line 7p and those extending from the back surface 7r toward the parting line 7p. Any transverse-groove rib 7c is tapered toward the parting line 7p. Ends 7d of the corresponding transverse-groove ribs 7c extending from the front surface 7f and ends 7d of the corresponding transverse-groove ribs 7c extending from the back surface 7r are welded together on the parting line 7p so that the strength is increased. The side walls of each transverse-groove rib 7c are approximately parallel with the input direction of the load F from the knee 3 and are plastically deformed by the load F from the knee 3. The number or size of the transverse-groove ribs 7c are correlated with the plastic deformation starting load of the low-load absorption unit 7. Accordingly, the plastic deformation starting load of the low-load absorption unit 7 can be adjusted by changing the number or size of the transverse-groove ribs 7c. In addition to changing the number or size of the transverse-groove ribs 7c, the plastic deformation starting load can also be adjusted by changing the thickness of the low-load absorption unit 7. The positions, number, and size of the transverse-groove ribs 7c are not limited to those shown in FIG. 2. For example, the transverse-groove ribs 7c may be disposed only on the right side surface 7m and left side surface 7l. Further, instead of the transverse-groove ribs 7c, for example, truncated conical ribs (so-called round ribs) whose circumferences decrease toward the parting line 7p may be disposed. As seen above, the configuration of the ribs of the low-load absorption unit 7 can be properly set in accordance with the plastic deformation starting load that the low-load absorption unit 7 is required to have.

The low-load absorption unit 7 also has, on the front surface 7f, a grid-shaped rib 7e for reinforcing the front surface 7f. Thus, when a strong shock is applied to a narrow region in the front surface 7f, the damage to the low-load absorption unit 7 is reduced. Further, the front surface 7f of the low-load absorption unit 7 is inclined downward with respect to the input direction of the load F from the knee 3. Thus, the front surface 7f can reliably receive the force from the knee 3, thereby preventing the knee 3 from slipping away from the knee bolster 1 upward.

Since the high-load absorption unit 9 is blow-molded using split molds 15m and 15l which are opened or closed in the transverse direction [the direction of an arrow H in FIGS. 2 and 5(b)] [see FIG. 5(b)], it has a parting line 9p formed over the front surface 9f, upper surface 9u, back surface 9r, and bottom surface 9b. Accordingly, the parting line surface (the surface surrounded by the parting line 9p) is approximately parallel with the input direction of the load F. The high-load absorption unit 9 has transverse-groove ribs 9c on the right side surface 9m and left side surface 9l. The transverse-groove ribs 9c include those recessed from the right side surface 9m toward the parting line 9p (that is, toward the hollow portion) and those recessed from the left side surface 9l toward the parting line 9p. Any transverse-groove ribs 9c is tapered toward the parting line 9p. Further, in order to increase the capacity for bearing the load F from the knee 3, the transverse-groove ribs 9c are formed in such a manner that they extend in the input direction of the load and the side walls thereof are approximately parallel with the input direction of the load F. The side walls of the transverse-groove ribs 9c are plastically deformed by the load F from the knee 3.

As shown in FIGS. 2, 3(c) and 3(d), the transverse-groove ribs 9c of the high-load absorption unit 9 are deeper than the transverse-groove ribs 7c of the low-load absorption unit 7 by a factor of approximately 6. For this reason, the area of the wall surfaces of the transverse-groove ribs 9c, which are approximately parallel with the input direction of the load F from the knee 3, is larger than that of the wall surfaces of the transverse-groove ribs 7c. Accordingly, the plastic deformation starting load of the high-load absorption unit 9 is higher than that of the low-load absorption unit 7. If higher strength is required, ends of the transverse-groove ribs 9c extending from the right side surface 9m and ends of the transverse-groove ribs 9l extending from the left side surface 9l may be welded together. The ratio of the depth of a transverse-groove rib 9c to the depth of a transverse-groove rib 7c is, for example, 4 to 8, preferably 5 to 7.

The high-load absorption unit 9 also has longitudinal groove-shaped ribs (hereafter referred to as the "longitudinal-groove ribs") 9e extending in a direction approximately perpendicular to the extending direction of the transverse-groove ribs 9c. The formation of the longitudinal-grooves rib 9e forms the high-load absorption unit 9 into a shape like an accordion, as shown in FIG. 4(b). Thus, it is possible to prevent the high-load absorption unit 9 which is becoming plastically deformed from bursting or becoming deformed toward a direction shifted from the input direction of the load F. Since the side walls of the longitudinal-groove ribs 9e do not receive the load F, the longitudinal-groove ribs 9e have a smaller depth than the transverse-groove ribs 9c.

A mounting piece 7g is formed integrally with the low-load absorption unit 7 on the parting line 7p of the low-load absorption unit 7. Since the mounting piece 7g has a thin part 7h, it can be easily laid down toward the high-load absorption unit 9. Further, since the mounting piece 7g has an engaging hole 7i, the low-load absorption unit 7 and high-load absorption unit 9 can be connected together by inserting an engaging protrusion 9i of the high-load absorption unit 9 into the engaging hole 7i. By using the split molds 13f and 13r shown in FIG. 5(a), the mounting piece 7g can be formed simultaneously when blow-molding the low-load absorption unit 7.

The ratio of the length of the high-load absorption unit 9 to the length of the knee bolster 1 in the input direction of the load F may be any ratio. For example, it is 55 to 80%, preferably 60 to 70%. If this ratio is too small, when a strong shock is applied, the energy would not be sufficiently absorbed. In contrast, if this ratio is too large, the ratio of the length of the low-load absorption unit 7 to the length of the knee bolster 1 is reduced accordingly. As a result, when a relatively small shock is applied, the knee 3 would not be protected sufficiently.

Since the length of the high-load absorption unit 9 in the input direction of the load F is relatively long, the high-load absorption unit 9 is preferably blow-molded using split molds complementary which are opened or closed in the transverse direction, like the molds 15m and 15l shown in FIG. 5(b). On the other hand, since the length of the low-load absorption unit 7 in the input direction of the load F is relatively short, the low-load absorption unit 7 is preferably blow-molded using split molds which are opened or closed in the front-back direction, like the split molds 13f and 13r shown in FIG. 5(a). Accordingly, the parting line surface of the high-load absorption unit 9 and the parting line surface of the low-load absorption unit 7 are preferably perpendicular to each other. If split molds which are opened or closed in the transverse direction are used to blow-mold the low-load absorption unit 7, it is not easy to form a molded product with ribs like the grid-shaped rib 7e because the molded product with the rib 7e cannot be easily extracted from the molds opened or closed in the transverse direction. Nor is it easy to integrally form a mounting piece 7g which can be easily laid down toward the high-load absorption unit 9.

As shown in FIGS. 4(a) and 4(b), a recess 7o and a protrusion 9o are formed on the back surface 7r of the low-load absorption unit 7 and the front surface 9f of the high-load absorption unit 9, respectively. The shapes of the recess 7o and the protrusion 9o are complementary to each other. Also formed on the back surface 7r of the low-load absorption unit 7 is a reinforcing member housing 7q housing an engagement reinforcing member 8 for reinforcing the engagement with the high-load absorption unit 9. Owing to this configuration, the low-load absorption unit 7 and high-load absorption unit 9 can be reliably engaged with each other using the engagement reinforcing member 8. As an alternative, the low-load absorption unit 7 and high-load absorption unit 9 may be directly engaged with each other without using the engagement reinforcing member 8. As another alternative, only the upper surfaces, left side surfaces, and right side surfaces of the low-load absorption unit 7 and high-load absorption unit 9 may be engaged with each other using the mounting piece 7g without engaging the back surface 7r and the front surface 9f with each other.

The high-load absorption unit 9 also has, on the back surface 9r, a mounting protrusion 9g for mounting the knee bolster 1 on the target 17 as shown in FIG. 6. As an example of the mounting method, the knee bolster 1 may be mounted on the target 17 by inserting the mounting protrusion 9g into a wide aperture 17a of the target 17 and then moving the knee bolster 1 downward and thus engaging a narrow part 1g (see FIGS. 3(a) and 3(b)) of the mounting protrusion 9g with a narrow aperture 17b of the target 17. The target 17 may be welded to the steering support member, or may be fixed to other components using a method such as screwing or welding. Examples of other methods for mounting the knee bolster 1 on the target 17 include a method disclosed in Patent Literature 2.

Next, referring to a graph of FIG. 7, there will be described the relationship between the load F applied to the knee bolster 1 of the present embodiment from the knee 3 and the amount of deformation of the knee bolster 1 caused by the load F. The graph of FIG. 7 and the following description are intended to conceptually clarify the principle on which the knee bolster 1 absorbs the energy of the shock, and the relationship between the load and the amount of deformation of the knee bolster 1 varies among embodiments. While FIG. 7 indicates an embodiment in which the load applied to the knee 3 is approximately constant while the low-load absorption unit 7 becomes deformed, there can be an embodiment in which the load gradually increases.

The low-load absorption unit 7 of the knee bolster 1 starts to be plastically deformed by a plastic deformation starting load F1, whereas the high-load absorption unit 9 starts to be plastically deformed by a plastic deformation starting load F2. The load F1 is, for example, 1 to 2 kN, and the load F2 is, for example, 4 to 6 kN. When the load F from the knee 3 is applied to the knee bolster 1, the knee bolster 1 initially becomes elastically deformed. Subsequently, when the amount of deformation of the knee bolster 1 reaches A, the low-load absorption unit 7 starts to become plastically deformed while absorbing the shock energy from the knee 3. At this time, the load applied to the knee 3 from the knee bolster 1 is maintained at approximately F1. When the amount of deformation of the knee bolster 1 reaches B, the low-load absorption unit 7 is substantially crushed and can no longer become plastically deformed. While the amount of deformation is between B and C, the high-load absorption unit 9 becomes elastically deformed. When the amount of deformation of the knee bolster 1 reaches C, the high-load absorption unit 9 starts to become plastically deformed while absorbing the shock energy from the knee 3. At this time, the load applied to the knee 3 from the knee bolster 1 is maintained at approximately F2. When the amount of deformation of the knee bolster 1 reaches D, the high-load absorption unit 9 is substantially crushed and can no longer become plastically deformed. Accordingly, the knee bolster 1 can no longer absorb the shock.

The knee bolster 1 has the functions described above. Thus, when the shock energy from the knee 3 is relatively small, it is absorbed by only the low-load absorption unit 7 which is becoming plastically deformed. Accordingly, the load applied to the knee 3 can be controlled to F1, so that the damage to the knee 3 can be controlled. When the shock energy from the knee 3 is large, it can be absorbed by both the low-load absorption unit 7 and high-load absorption unit 9 which are becoming plastically deformed. Thus, the damage to the knee 3 can be minimized. Preferably, the plastic deformation starting loads F1 and F2 of the low-load absorption unit 7 and high-load absorption unit 9, respectively, can be flexibly adjusted in accordance with the type, design concept, or the like of the vehicle. Since the low-load absorption unit 7 and high-load absorption unit 9 are formed of a blow-molded body in the present embodiment, the plastic deformation starting loads F1 and F2 can be easily changed by changing the thicknesses thereof or rib configuration. Further, since the knee bolster 1 of the present embodiment is formed of a blow-molded body, it can contribute to a reduction in the vehicle weight unlike traditional metal knee bolsters.

2. Second Embodiment

Figure 8:
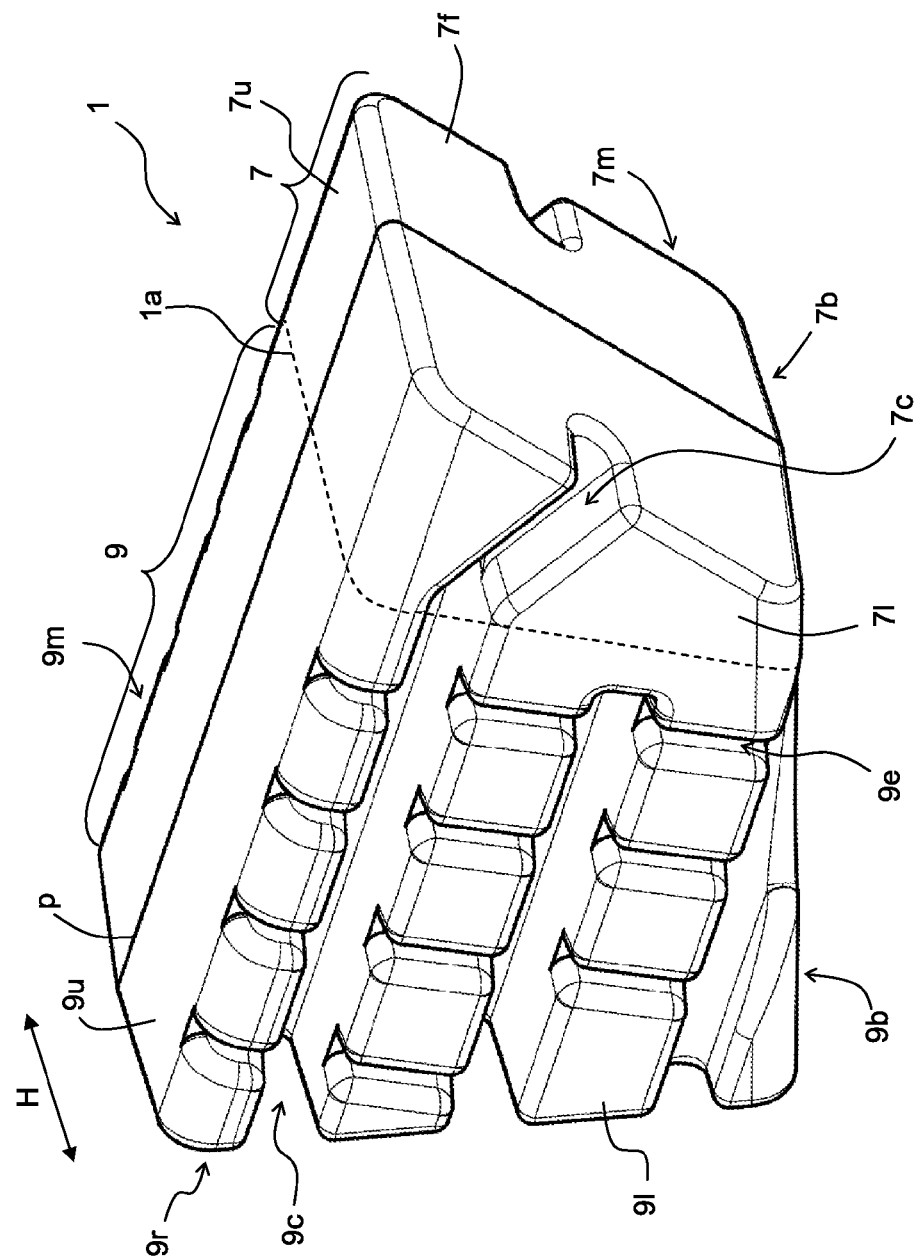
FIG. 8 is a perspective view of a knee bolster 1 of a second embodiment of the present invention.
Figure 9:
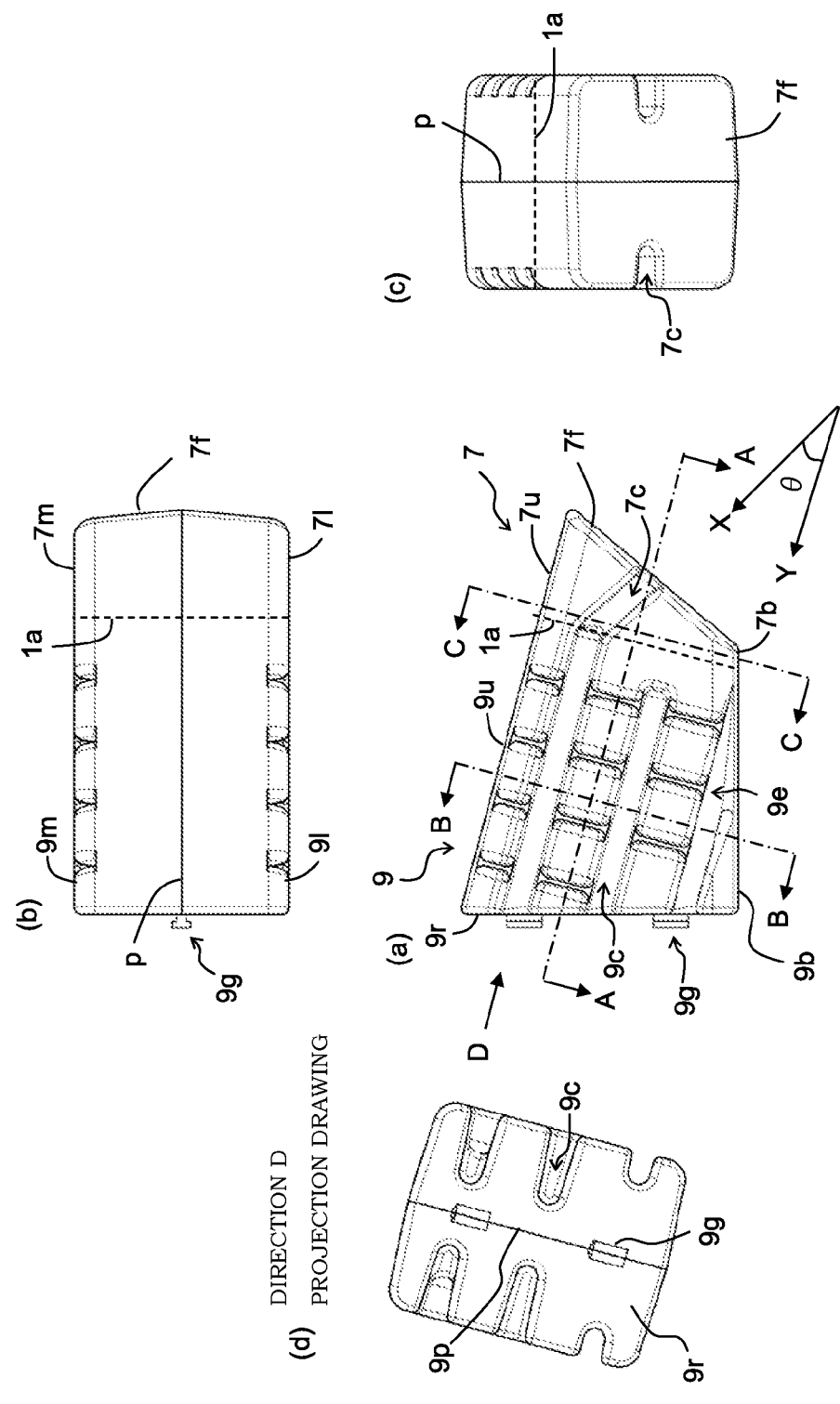
FIGS. 9(a) to 9(c) are a front view, plan view, and right side view, respectively, of the knee bolster 1 in FIG. 8.
FIG. 9(d) is a projection drawing in the direction of an arrow D in FIG. 9(a).
Figure 10:
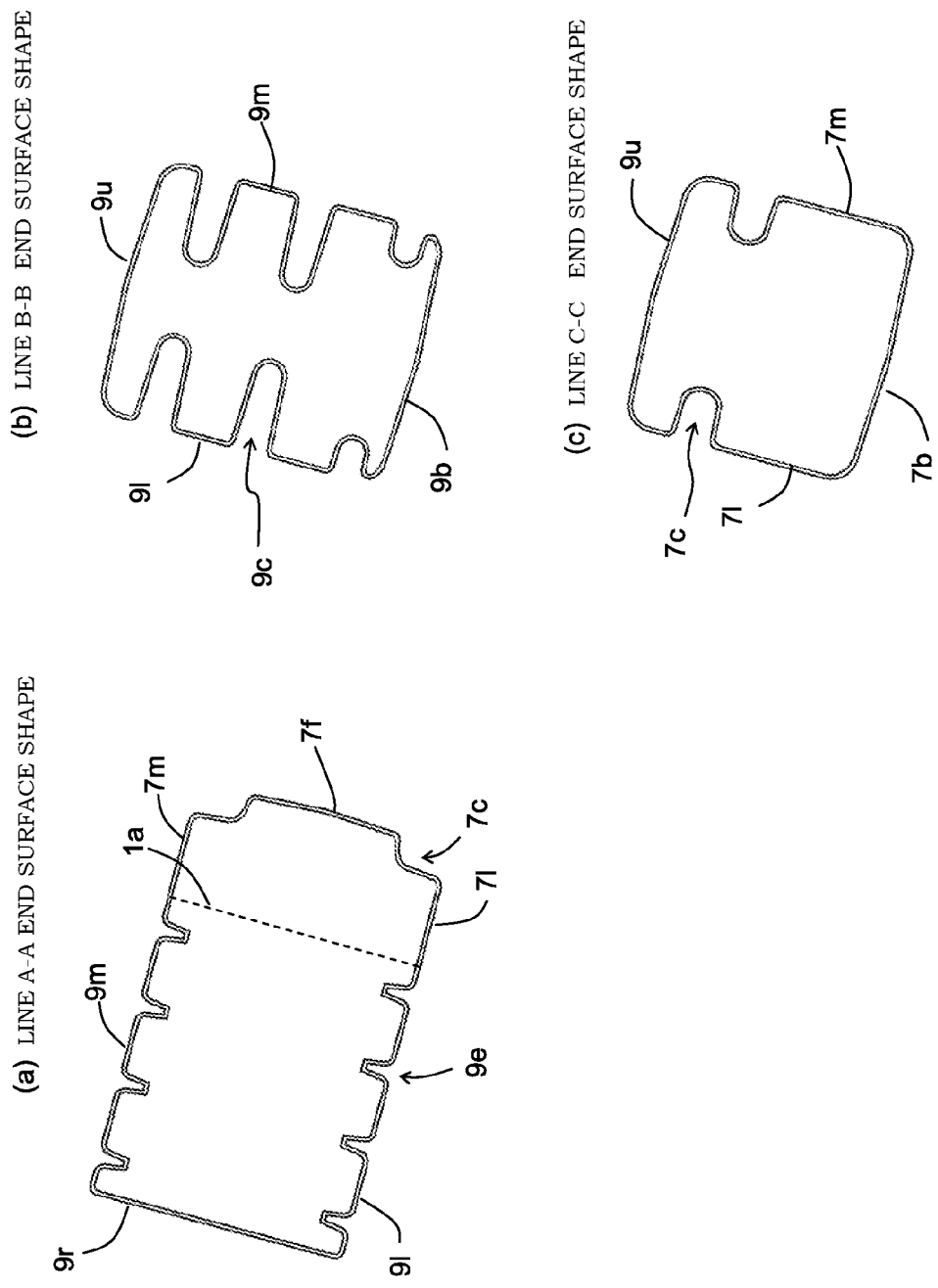
FIGS. 10(a) to 10(c) show line A-A, line B-B, and line C-C end surface shapes, respectively, in FIG. 9(a).

Referring to FIGS. 8 to 10, there will be described a knee bolster 1 of a second embodiment of the present invention. FIG. 8 is a perspective view of the knee bolster 1. FIGS. 9(a) to 9(c) are a front view, a plan view, and a right side view, respectively, of the knee bolster 1. FIG. 9(d) is a projection drawing in the direction of an arrow D in FIG. 9(a). FIGS. 10(a) to 10(c) show line A-A, line B-B, and line C-C end surface shapes, respectively, in FIG. 9(a). FIG. 11 is a drawing showing an example of split molds and corresponding to the line A-A end surface shape in FIG. 9(a).

The knee bolster 1 of the present embodiment has the same basic configuration as the first embodiment, that is, it includes a low-load absorption unit 7 and a high-load absorption unit 9. The knee bolster 1 of the present embodiment also has the same shock energy absorption principle as that of the first embodiment. For common parts, the descriptions of the first embodiment also apply to the present embodiment.

In the knee bolster 1 of the present embodiment, as shown in FIG. 8, the low-load absorption unit 7 and high-load absorption unit 9 are formed of a single blow-molded hollow body. The low-load absorption unit 7 is a part ahead of a virtual boundary 1a of the knee bolster 1, and the high-load absorption unit 9 is a part behind of the virtual boundary 1a. While the boundary between the low-load absorption unit 7 and high-load absorption unit 9 is clearly delineated by the virtual boundary 1a in the present embodiment, such a clear boundary does not have to exist between the low-load absorption unit 7 and high-load absorption unit 9. The low-load absorption unit 7 may gradually make a transition to the high-load absorption unit 9. For example, if the depth of the transverse-groove ribs is gradually increased or if the angle of the transverse-groove ribs is gradually changed, any clear boundary does not appear between the low-load absorption unit 7 and high-load absorption unit 9. Such a configuration may also be employed.

The low-load absorption unit 7 has a front surface 7f that is adjacent to a knee 3 and serves as the load input surface, an upper surface 7u, a bottom surface 7b, a right side surface 7m, and a left side surface 7l. The upper surface 7u, the bottom surface 7b, the right side surface 7m and the left side surface 7l extends from the front surface 7f backward, respectively. The high-load absorption unit 9 has a back surface 9r opposite to the front surface 9f of the low-load absorption unit 7, an upper surface 9u, a bottom surface 9b, a right side surface 9m, and a left side surface 9l. The upper surface 9u, the bottom surface 9b, the right side surface 9m and the left side surface 9l extends from the back surface 9r forward, respectively.

Since the knee bolster 1 of the present embodiment is blow-molded using split molds 19m and 19l which are opened or closed in the transverse direction (the direction of an arrow H in FIGS. 8 and 11) as shown in FIG. 11, it has a parting line 9 formed over the front surface 7f, upper surfaces 7u and 9u, back surface 9r, and bottom surfaces 9b and 7b.

The low-load absorption unit 7 has transverse-groove ribs 7c on the right side surface 7m and left side surface 7l. The high-load absorption unit 9 has transverse-groove ribs 9c on the right side surface 9m and left side surface 9l. The transverse-groove ribs 7c of the low-load absorption unit 7 are formed so as to be shallower than the transverse-groove ribs 9c of the high-load absorption unit 9. The number of the transverse-groove ribs 7c is smaller than that of the transverse-groove ribs 9c. Further, as shown in FIG. 9(a), the extending direction X of the transverse-groove ribs 7c is shifted from the input direction Y of the load F from the knee 3 by an angle θ. The load receiving capacity of the side walls of the transverse-groove ribs 7c is reduced accordingly. Owing to the configuration above, the plastic deformation starting load of the low-load absorption unit 7 becomes lower than that of the high-load absorption unit 9. Note that the extending direction X of the transverse-groove ribs 7c need not necessarily be shifted from the load input direction Y and may be aligned with the load input direction Y, as with that of the transverse-groove ribs 9c. The size of the angle θ is, for example, 10 to 50 degrees, preferably 20 to 40 degrees. If the angle θ is too small, the plastic deformation starting load of the low-load absorption unit 7 is less likely to become sufficiently low; if the angle θ is too large, the plastic deformation starting load would become too low.

The functions of the transverse-grooves rib 9c and longitudinal-groove ribs 9e of the high-load absorption unit 9 are similar to those in the first embodiment. The configuration and usage of a mounting protrusion 9g disposed on the back surface 9r of the high-load absorption unit 9 are also similar to those in the first embodiment.

As seen above, according to the present embodiment, the low-load absorption unit 7 and high-load absorption unit 9 can be formed of a single blow-molded body.

In the above two embodiments, the knee bolster 1 includes the low-load absorption unit 7 and high-load absorption unit 9. If necessary, a medium-load absorption unit whose plastic deformation starting load is a value between those of the low-load absorption unit 7 and high-load absorption unit 9 may be disposed between the low-load absorption unit 7 and high-load absorption unit 9. In the first embodiment, the medium-load absorption unit may be another blow-molded body, or may be a part of the blow-molded body serving as the low-load absorption unit 7 or a part of the blow-molded body serving as the high-load absorption unit 9.

REFERENCE SIGNS LIST

1: knee bolster
7: low-load absorption unit
9: high-load absorption unit
7p, 9p, p: parting line
7c, 9c: transverse-groove rib

The invention claimed is:

1. A knee bolster that becomes deformed when a load from a knee of a passenger is inputted and thus absorbs a shock applied to the knee, the knee bolster comprising:
   a low-load absorption unit having a load input surface to which the load from the knee is inputted;
   a high-load absorption unit disposed in a more distant position from the knee than the low-load absorption unit in an input direction of the load and having a higher plastic deformation starting load than a plastic deformation starting load of the low-load absorption unit,
   wherein the low-load absorption unit and the high-load absorption unit are formed of a single hollow structure or different hollow structures,
   wherein the low-load absorption unit and the high-load absorption unit each comprise a transverse groove-shaped rib having a wall surface configured to be plastically deformed by the load, and
   wherein the transverse groove-shaped rib of the high-load absorption unit is formed so as to be larger in number than the transverse groove-shaped rib of the low-load absorption unit.

2. The knee bolster of claim 1, wherein the high-load absorption unit comprises a rib having a wall surface and recessed toward a hollow portion, the wall surface being configured to be plastically deformed by the load, and
   the rib is formed so that the plastic deformation starting load of the high-load absorption unit becomes larger than the plastic deformation starting load of the low-load absorption unit.

3. The knee bolster of claim 1, wherein the high-load absorption unit comprises a transverse groove-shaped rib having a wall surface and extending in the input direction of the load, the wall surface being configured to be plastically deformed by the load.

4. The knee bolster of claim 1, wherein the high-load absorption unit comprises a transverse groove-shaped rib having a wall surface and extending in the input direction of the load, the wall surface being configured to be plastically deformed by the load, and a longitudinal groove-shaped rib extending in a direction approximately perpendicular to an extending direction of the transverse groove-shaped rib.

5. The knee bolster of claim 1, wherein the load input surface is inclined downward with respect to the load input direction.

6. The knee bolster of claim 1, wherein the low-load absorption unit and the high-load absorption unit are formed of a single blow-molded hollow body.

7. A knee bolster that becomes deformed when a load from a knee of a passenger is inputted and thus absorbs a shock applied to the knee, the knee bolster comprising:
   a low-load absorption unit having a load input surface to which the load from the knee is inputted;
   a high-load absorption unit disposed in a more distant position from the knee than the low-load absorption unit in an input direction of the load and having a higher plastic deformation starting load than a plastic deformation starting load of the low-load absorption unit, and
   wherein the low-load absorption unit and the high-load absorption unit are formed of a single hollow structure or different hollow structures,
   wherein the low-load absorption unit and the high-load absorption unit are formed of different blow-molded hollow bodies, a parting line surface of the low-load absorption unit is approximately perpendicular to the input direction of the load, and a parting line surface of the high-load absorption unit is approximately parallel with the input direction of the load.

8. The knee bolster of claim 7, wherein the low-load absorption unit has a grid-shaped rib on the load input surface.

9. The knee bolster of claim 7, wherein the low-load absorption unit has, on a parting line thereof, a mounting piece for connecting the low-load absorption unit and the high-load absorption unit.

* * * * *